US011290385B2

(12) United States Patent
Hammam et al.

(10) Patent No.: US 11,290,385 B2
(45) Date of Patent: Mar. 29, 2022

(54) METHOD AND TRAFFIC PROCESSING UNIT FOR HANDLING TRAFFIC IN A COMMUNICATION NETWORK

(71) Applicant: Telefonaktiebolaget LM Ericsson (publ), Stockholm (SE)

(72) Inventors: Tarik Hammam, Kista (SE); Anders Franzen, Trångsund (SE); János Kövér, Johanneshov (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/954,138

(22) PCT Filed: Dec. 15, 2017

(86) PCT No.: PCT/SE2017/051279
§ 371 (c)(1),
(2) Date: Jun. 15, 2020

(87) PCT Pub. No.: WO2019/117775
PCT Pub. Date: Jun. 20, 2019

(65) Prior Publication Data
US 2021/0168082 A1 Jun. 3, 2021

(51) Int. Cl.
*H04L 12/747* (2013.01)
*H04L 12/861* (2013.01)
(Continued)

(52) U.S. Cl.
CPC ........ *H04L 47/2441* (2013.01); *H04L 45/742* (2013.01); *H04L 47/2483* (2013.01); *H04L 49/9063* (2013.01)

(58) Field of Classification Search
CPC .............. H04L 47/2441; H04L 45/742; H04L 47/2483; H04L 49/9063; H04L 49/205; H04L 41/0896; H04L 47/24
See application file for complete search history.

(56) References Cited

U.S. PATENT DOCUMENTS 7,324,553 B1 * 1/2008 Varier ................. H04L 41/0896
370/235
9,332,075 B2 5/2016 Jiang et al.
(Continued)

OTHER PUBLICATIONS

International Search Report and Written Opinion dated Sep. 28, 2018 issued in International Patent Application No. PCT/SE2017/051279. (9 pages).
(Continued)

*Primary Examiner* — Mohamed A Kamara
(74) *Attorney, Agent, or Firm* — Rothwell, Figg, Ernst & Manbeck, P.C.

(57) ABSTRACT

A method and a traffic processing unit (200) for handling traffic in a communication network when the traffic is distributed across a set of traffic processing units. When receiving a packet of a traffic flow distributed to said traffic processing unit, the traffic processing unit (200) assigns a packet class to the received packet, which class can be active or inactive in the traffic processing unit. The traffic processing unit obtains state information of the assigned packet class. If the packet class is detected as active the state information is retrieved from a local storage (200C) in the traffic processing unit, and if the packet class is detected as inactive the state information is fetched from a central storage (204). The traffic processing unit then performs stateful packet processing of the received packet based on the obtained state information.

20 Claims, 4 Drawing Sheets

(51) Int. Cl.
*H04L 47/2441* (2022.01)
*H04L 45/74* (2022.01)
*H04L 47/2483* (2022.01)
*H04L 49/90* (2022.01)

(56) References Cited

U.S. PATENT DOCUMENTS

| | | |
|---|---|---|
| 2013/0308438 A1 | 11/2013 | Callan et al. |
| 2014/0226466 A1 | 8/2014 | Pettersson et al. |
| 2014/0347993 A1 | 11/2014 | Hammam et al. |
| 2015/0016266 A1 | 1/2015 | Dumitrescu et al. |
| 2016/0065455 A1* | 3/2016 | Wang ................ H04L 47/2441 370/419 |
| 2017/0149670 A1* | 5/2017 | Backman ................ H04L 45/38 |
| 2018/0034737 A1* | 2/2018 | Wackerly .............. H04L 45/306 |
| 2019/0005100 A1* | 1/2019 | Jager ................... G06F 16/2457 |

OTHER PUBLICATIONS

C. Hopps, NextHop Technologies; Network Working Group, Request for Comments (RFC): 2992, "Analysis of an Equal-Cost Multi-Path Algorithm" (Nov. 2000). (8 pages).

\* cited by examiner

METHOD AND TRAFFIC PROCESSING UNIT FOR HANDLING TRAFFIC IN A COMMUNICATION NETWORK

CROSS REFERENCE TO RELATED APPLICATION(S)

This application is a 35 U.S.C. § 371 National Stage of International Patent Application No. PCT/SE2017/051279, filed Dec. 15, 2017, designating the United States.

TECHNICAL FIELD

The present disclosure relates generally to a method and a traffic processing unit, for handling traffic in a communication network when the traffic is distributed across a set of traffic processing units.

BACKGROUND

In communication networks where data is communicated in different traffic flows, it is common to implement a traffic processing function, e.g. firewall processing, by means of resources in a set of more or less uniform processing units so that traffic flows can be distributed across the traffic processing units in some desirable manner. In this description, the processing units of such a set will be denoted "traffic processing units" or traffic processors for short. If the processing must be performed based on some specific state information, referred to as stateful processing, the traffic processing unit that handles a specific traffic flow needs to have access to state information pertaining to that traffic flow. This state information is typically stored locally at the traffic processing unit itself or it can be fetched from some central storage where state information of ongoing traffic flows is maintained.

In this context, state information refers to any information, such as parameters, identifiers, descriptors, references, etc., that is somehow related to the ongoing traffic flow. For example, in the case of a processing unit having the function of a stateful firewall, the state information usually reflects some part of a state changing history of a communication protocol state machine which the firewall function tracks in order to detect illicit protocol manipulation.

The above distribution of processing resources across a set of multiple traffic processing units, which may be done by a distribution device or the like connected to each traffic processing unit, can be beneficial to employ for several reasons. For example, the traffic can be load balanced so that the processing workload is spread out evenly across the traffic processing units so as to achieve high capacity and efficiency and to avoid delaying bottlenecks as well as under-used units. Another reason for employing such distribution of traffic flow may be to achieve a flexible or "scalable" capacity of the processing function so that it can be adapted to current needs and requirements, e.g. by adding more traffic processing units to the set to increase the total capacity, or removing traffic processing units from the set if the total capacity is larger than needed. It may further be desirable to adapt the processing capacity in a more or less dynamic manner, e.g. by hiring processing equipment as virtual machines in a cloud-like environment, which may be useful in situations where the load on the processing function varies greatly.

However, it is a problem that when the processing is stateful and requires some specific state information, and a traffic processing unit currently used for an ongoing traffic flow is inactivated for whatever reason, the state information must be migrated from the old traffic processing unit to a new one so that the new traffic processing unit can continue the processing based on the same state information. There are several solutions to accomplish such a migration but they introduce considerable complexity which could be difficult and/or costly to realize.

SUMMARY

It is an object of embodiments described herein to address at least some of the problems and issues outlined above. It is possible to achieve this object and others by using a method and a node as defined in the attached independent claims.

According to one aspect, a method is performed by a traffic processing unit for handling traffic in a communication network when the traffic is distributed across a set of traffic processing units. In this method, the traffic processing unit receives a packet of a traffic flow distributed to said traffic processing unit, and assigns a packet class to the received packet, out of a set of predefined classes, based on information derived from the received packet. The assigned packet class can be detected as being active or inactive in the traffic processing unit based on an activity indicator of the packet class maintained in the traffic processing unit.

The traffic processing unit further obtains state information pertaining to the assigned packet class. This is done such that if the packet class is detected as active the state information is retrieved from a local storage in the traffic processing unit, and if the packet class is detected as inactive the state information is fetched from a central storage where state information of different packet classes is maintained. The traffic processing unit then performs stateful packet processing of the received packet based on the obtained state information.

According to another aspect, a traffic processing unit is arranged to handle traffic in a communication network when the traffic is distributed across a set of traffic processing units. The traffic processing unit is configured to receive a packet of a traffic flow distributed to said traffic processing unit, and to assign a packet class to the received packet, out of a set of predefined classes, based on information derivable from the received packet, wherein the packet class is detected as being active or inactive in the traffic processing unit based on an activity indicator of the packet class maintained in the traffic processing unit.

The traffic processing unit is also configured to obtain state information pertaining to said assigned packet class, such that if the packet class is detected as active the state information is retrieved from a local storage in the traffic processing unit, and if the packet class is detected as inactive the state information is fetched from a central storage where state information of different packet classes is maintained.

The traffic processing unit is further configured to perform stateful packet processing of the received packet based on the obtained state information.

The above method and traffic processing unit may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Figure 1:
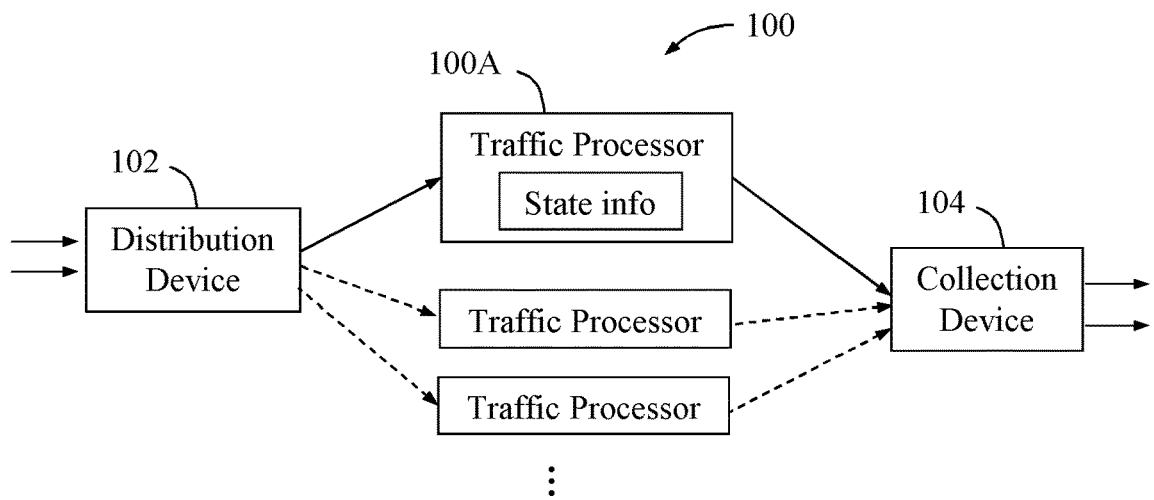
FIG. 1 is a communication scenario illustrating how traffic is distributed across a set of traffic processing units in a communication network, where the solution could be used.

Briefly described, a solution is provided that enables a data processing unit to obtain and use state information in an easy manner for processing an incoming traffic flow, regardless of whether the state information already exists in the data processing unit or must be acquired otherwise. FIG. 1 illustrates a communication scenario where the solution could be employed for handling traffic in a communication network when the traffic, i.e. packets, is distributed across multiple traffic processing units 100. It is shown that a distribution device 102 distributes a packet to one of the traffic processing units 100A which then obtains state information for the packet and performs stateful processing of the packet based on the obtained state information.

After the processing is completed, the traffic processing unit 100A may send the packet to a collection device 104 or the like which is responsible for routing the packet towards its destination. The solution and embodiments to be described herein are directed to how valid state information can be obtained for a packet in an efficient manner without causing significant delays, by either retrieving the state information from a local memory in the traffic processing unit 100A or by fetching it from a central storage.

This can be accomplished by assigning a packet class to the received packet and checking an activity indicator of the packet class maintained in the traffic processing unit. If the activity indicator indicates the packet class as active, this means that valid state information is available from a local memory in the traffic processing unit 100A. On the other hand, if the activity indicator indicates the packet class as inactive, this means that no valid state information is available from the local memory and it must be fetched from a central storage where state information of different packet classes is maintained.

The solution and various embodiments thereof will be described herein in terms of functionality in a traffic processing unit, such as the above-mentioned traffic processing unit 100A, which operates to handle traffic in a communication network when the traffic is distributed across a set of traffic processing units.

Figure 2:
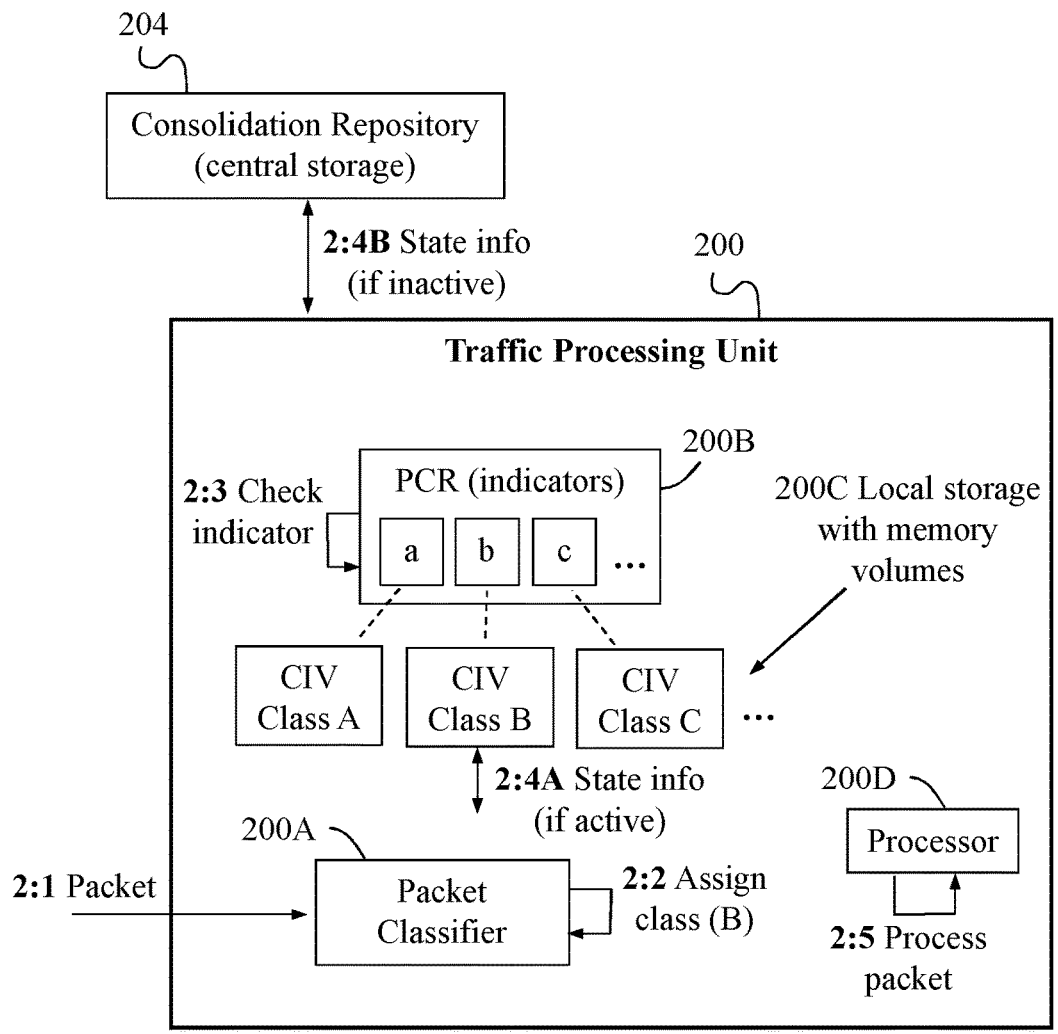
FIG. 2 is a block diagram illustrating an example of how the solution may be employed in a traffic processing unit, according to some example embodiments.

An example of how such a traffic processing unit may be configured with various functionalities will first be described with reference to the block diagram illustrated in FIG. 2, and with further reference to FIG. 1. The traffic processing unit 200 is shown to comprise the following functional entities which may be implemented in any suitable manner, e.g. by a combination of hardware and software. However, the solution is not limited to this example of functional entities.

The traffic processing unit 200 comprises a function for packet classification denoted packet classifier 200A. An action 2:1 illustrates that a packet is received at the traffic processing unit 200, which may have been distributed thereto by a distribution device 102. The packet classifier 200A then assigns a packet class to the received packet based on information derived from the received packet, in an action 2:2. For example, the information in the received packet may comprise at least one of a source address and a destination address, which thus indicate from where the packet has been sent and to where it should be further sent. Such information can thus be used for determining the packet class of the received packet. In further examples, the packet class could be determined by applying a mathematical function or logical hash operation on any information in the packet, for example, a logical/Boolean operator "Exclusive OR (XOR)" may be applied to information fields in the packet header, such as Source address XOR Destination address XOR Source port XOR Destination port XOR Protocol.

The traffic processing unit 200 in this example also comprises a packet class record 200B holding activity indicators of different packet classes for traffic flows that have been handled previously by the traffic processing unit. In the packet class record 200B a number of activity indicators a, b, c . . . may be stored and each activity indicator indicates that a particular associated packet class A, B, C . . . is either active or inactive in the traffic processing unit 200.

The packet class record 200B may hold activity indicators of all possible packet classes, such that those packet classes that have valid associated state information already available in the traffic processing unit 200 are indicated as active, while those packet classes that do not have any valid state information available in the traffic processing unit 200 are indicated as inactive. Any state information may be maintained as valid in the traffic processing unit 200 for a prescribed duration until a suitable timeout occurs after which the state information can be deleted and the corresponding activity indicator is changed from active to inactive. The latter may be done even if the expired state information remains in the traffic processing unit 200.

The traffic processing unit 200 further comprises a local storage 200C where state information is being stored in memory volumes for different packet classes that have been assigned to packets when previously processed by the traffic processing unit 200. These memory volumes are denoted Class Information Volumes, CIVs. In this example, activity indicator "a" indicates that class A is active and has associated state information stored in a CIV allocated for class A in the local storage 200C. Likewise, activity indicators "b" and "c" indicate that classes B and C are also active by having associated state information stored in corresponding CIVs in the local storage 200C.

The traffic processing unit 200 is further operable to obtain state information pertaining to the assigned packet class, e.g. by checking the activity indicator of the packet class assigned to the received packet and obtaining the state information according to the activity indicator. As indicated above, the activity indicator can be checked in the PCR 200B as illustrated by an action 2:3. If the activity indicator indicates the assigned packet class as active, the state information is available in the traffic processing unit and can thus be retrieved from the local storage 200C, as illustrated by an action 2:4A. If the activity indicator indicates the assigned packet class as inactive, the state information is fetched from a central storage 204 where state information of different packet classes is maintained, as illustrated by an alternative action 2:4B. The central storage 204 may also be denoted a "Consolidation Repository", as in FIG. 2.

Having obtained the state information in either of actions 2:4A and 2:4B, the traffic processing unit 200 is able to perform stateful packet processing of the received packet based on the obtained state information as illustrated by an action 2:5.

Thereby, it is an advantage that the traffic processing unit 200 can easily and promptly obtain state information either locally or from a central storage by means of packet classes and associated activity indicators which have been predefined in the traffic processing unit 200. A packet class can easily be assigned to incoming packets based on information in the packet. It is also an advantage that the traffic processing unit 200 can immediately determine whether the state information is available locally or must be fetched from a central storage, based on the associated activity indicator. Thereby, it is not necessary that the distribution device 102 must be aware of how and where any required state information can be obtained since that is determined by the traffic processing unit 200 itself. As a result, the distribution device 102 can be implemented with very simple functionality and to low costs.

Figure 3:
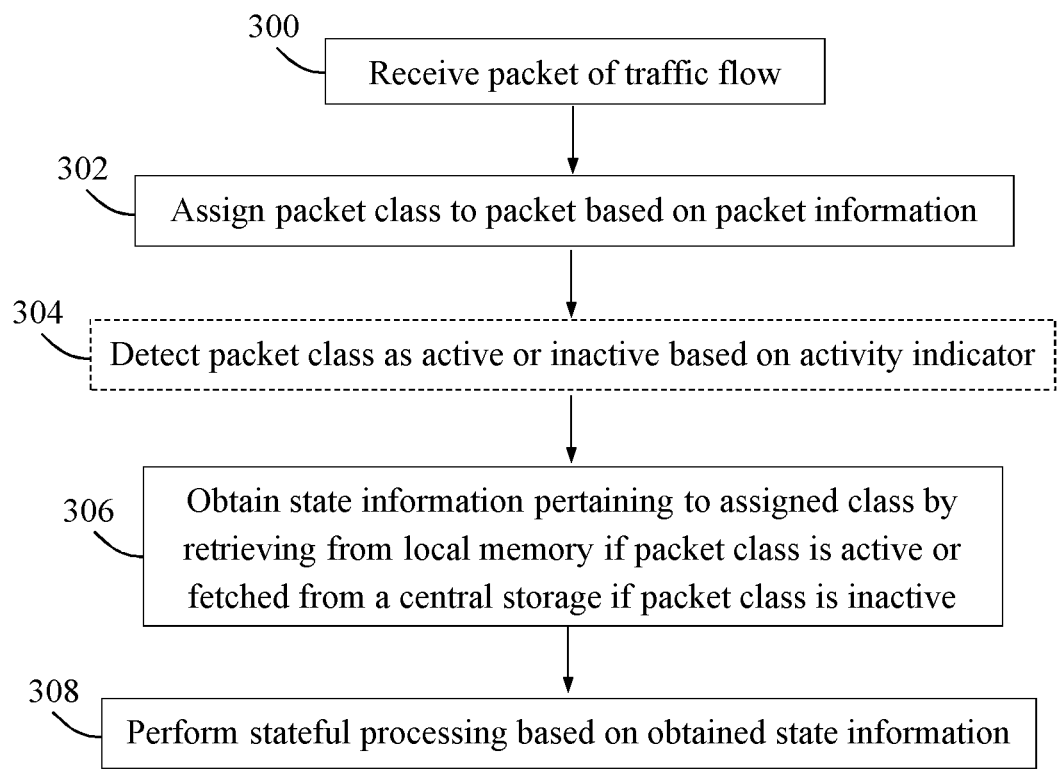
FIG. 3 is a flow chart illustrating a procedure in a traffic processing unit, according to further example embodiments.

An example will now be described with reference to the flow chart in FIG. 3, of how the solution may be employed in terms of actions performed by a traffic processing unit such as the above-described traffic processing unit 200. FIG. 3 is described below with further reference to FIG. 2 although without limitation to such a configuration of the traffic processing unit 200. Some optional example embodiments that could be used in this procedure will also be described below.

The actions shown in FIG. 3 are thus performed by a traffic processing unit 200 for handling traffic in a communication network when the traffic is distributed across a set of traffic processing units. It is assumed that the traffic processing unit 200 is capable of receiving traffic flows, e.g. when distributed by traffic distributor such as the above-described distribution device 102.

A first action 300 illustrates that the traffic processing unit 200 receives a packet of a traffic flow distributed to said traffic processing unit, which corresponds to action 2:1 above. In a next action 302, the traffic processing unit 200 assigns a packet class to the received packet, out of a set of predefined classes, based on information derived from the received packet, which corresponds to action 2:2 above. In another action 304, the packet class may be detected or noted or in any way observed, as being either active or inactive in the traffic processing unit based on an activity indicator of the packet class maintained in the traffic processing unit, which corresponds to action 2:3 above.

In a further action 306, the traffic processing unit 200 obtains state information pertaining to said assigned packet class, which can be made as follows. If the packet class is detected or noted as active, this indicates that the state information is maintained locally in the traffic processing unit 200 which therefore can retrieve the state information from a local storage 200C in the traffic processing unit, which corresponds to action 2:4A above. On the other hand, if the packet class is detected or noted as inactive, this indicates that the state information is not maintained locally in the traffic processing unit 200 which therefore needs to fetch the state information from a central storage 204 where state information of different packet classes is maintained. The latter alternative corresponds to action 2:4B above.

A final action 308 illustrates that the traffic processing unit 200 performs stateful packet processing of the received packet based on the obtained state information, that is either from the local storage 200C or from the central storage 204.

Some optional example embodiments that could be used in this procedure will now be described. In one example embodiment, if the packet class is detected as inactive, meaning that any state information pertaining to the packet class was fetched from the central storage in action 306, the traffic processing unit 200 further stores the fetched state information in a memory volume of said local storage associated with the packet class. Thereby, the traffic processing unit 200 can build up its own database of state information for different packet classes by repeating the fetching action for further traffic flows, and the possibility of finding state information locally will gradually increase which in turn reduces the load on the network and on the central storage. In particular, fetching all the state information pertaining to the inactive packet class is advantageous since the local storage is thereby updated with valid state information for the new packets that arrive to the processing unit and which are "assigned" the same packet class.

In case the packet class was detected as inactive and state information was fetched and stored as above, another example embodiment may be that the traffic processing unit 200 changes the activity indicator of said packet class from inactive to active. This will indicate that the newly fetched state information is now available locally as stored in the memory volume associated with the packet class. For example, if the locally stored state information is not retrieved and used by the traffic processing unit 200 for a certain prescribed time-out period, the state information may be considered to have expired and can therefore be deleted from the local storage, to save memory space therein.

In another example embodiment, the activity indicator may in the traffic processing unit 200 be maintained in a packet class record 200B with activity indicators of different packet classes for traffic flows that have been handled by the traffic processing unit. This embodiment has also been described above with reference to the PCR 200B in FIG. 2.

In another example embodiment, the local storage 200C in the traffic processing unit 200 may comprise multiple memory volumes containing state information of different packet classes. In another example embodiment, each local memory volume may contain state information of one or more packet classes. It is also possible that state information of one packet class is distributed across more than one local memory volume. How the state information of different packet classes is stored in one or more local memory volumes is dependent on how the latter are dimensioned and arranged and on the size of the state information.

It was mentioned above that a packet class is assigned to the received packet based on information in the received packet. In another example embodiment, such information derived from the received packet may comprise at least one of a source address and a destination address, which thus can be used for determining the packet class of the received packet. It is also possible that each packet of a flow comprises a flow descriptor or identifier that could be used for assigning the packet class.

In another example embodiment, if the state information for said traffic flow is changed, the traffic processing unit 200 may update the local memory volume and the central storage accordingly. In another example embodiment, the traffic processing unit 200 may receive the traffic when distributed by a stateless distribution device 102 such as a layer-3 Ethernet switch. In yet another example embodiment, the traffic processing unit could be implemented as a Virtual Machine, VM, in a cloud environment.

It was mentioned above that the activity indicator for a packet class is changed from inactive to active as state information is fetched from the central storage, and also that it may be changed from active to inactive if the locally stored state information has expired and/or is deemed to be no longer valid. Some examples of how a change of the activity indicator for a packet class may be triggered will be outlined below, with further reference to FIG. 2.

Change from Inactive to Active

In one example, the change from inactive to active may occur due to a concluded fetching of state information from the central storage, i.e. the consolidation repository 204.

In another example, the change from inactive to active may occur as an immediate result of the arrival at the traffic processing unit 200 of the first packet of a packet class. The packet processing for this packet class is then held in abeyance until the fetching of data from the consolidation repository 204 is concluded for said packet class.

In yet another example, the change from inactive to active may occur in response to a signal from the consolidation repository 204, or in response to a signal from a separate monitoring system function, not shown.

Change from Active to Inactive

In one example, the change from active to inactive may occur in response to expiry of a timer (timeout) indicating that no packets for the packet class in question has arrived before said timer expiry.

In another example, the change from active to inactive may occur in response to deletion of invalid state information from the memory volume in the local storage 200C.

In yet another example, the change from active to inactive may occur in response to a signal from the consolidation repository 204, or in response to a signal from the above-mentioned separate monitoring system function.

An example of how a traffic processing unit may operate in more detail will now be described referring to the flow chart in FIG. 4, again with further reference to FIG. 2 but without limitation to the structure depicted therein. The situation in this example is basically the same as in FIG. 3, although certain features and variations are illustrated in more detail.

A first action 400 illustrates that the traffic processing unit 200 receives a packet of a flow and assigns a packet class to the packet, basically in the manner described above for actions 300-302. In a next action 402, the traffic processing unit 200 checks the activity indicator of the assigned packet class, e.g. as maintained in a PCR 200B as of FIG. 2.

If it is found in a next determining action 404 that the activity indicator indicates the assigned packet class is active, the traffic processing unit 200 can retrieve the state information from a memory unit in the local storage 200C in an action 406, which has also been described above for action 2:4A. On the other hand, if the activity indicator indicates the assigned packet class is inactive, the traffic processing unit 200 must fetch the state information from the central storage 204 in another action 408, which has also been described above for action 2:4B. A further action 410 illustrates that the traffic processing unit 200 performs stateful packet processing of the received packet based on the obtained state information, which has also been described above for action 2:5.

Figure 4:
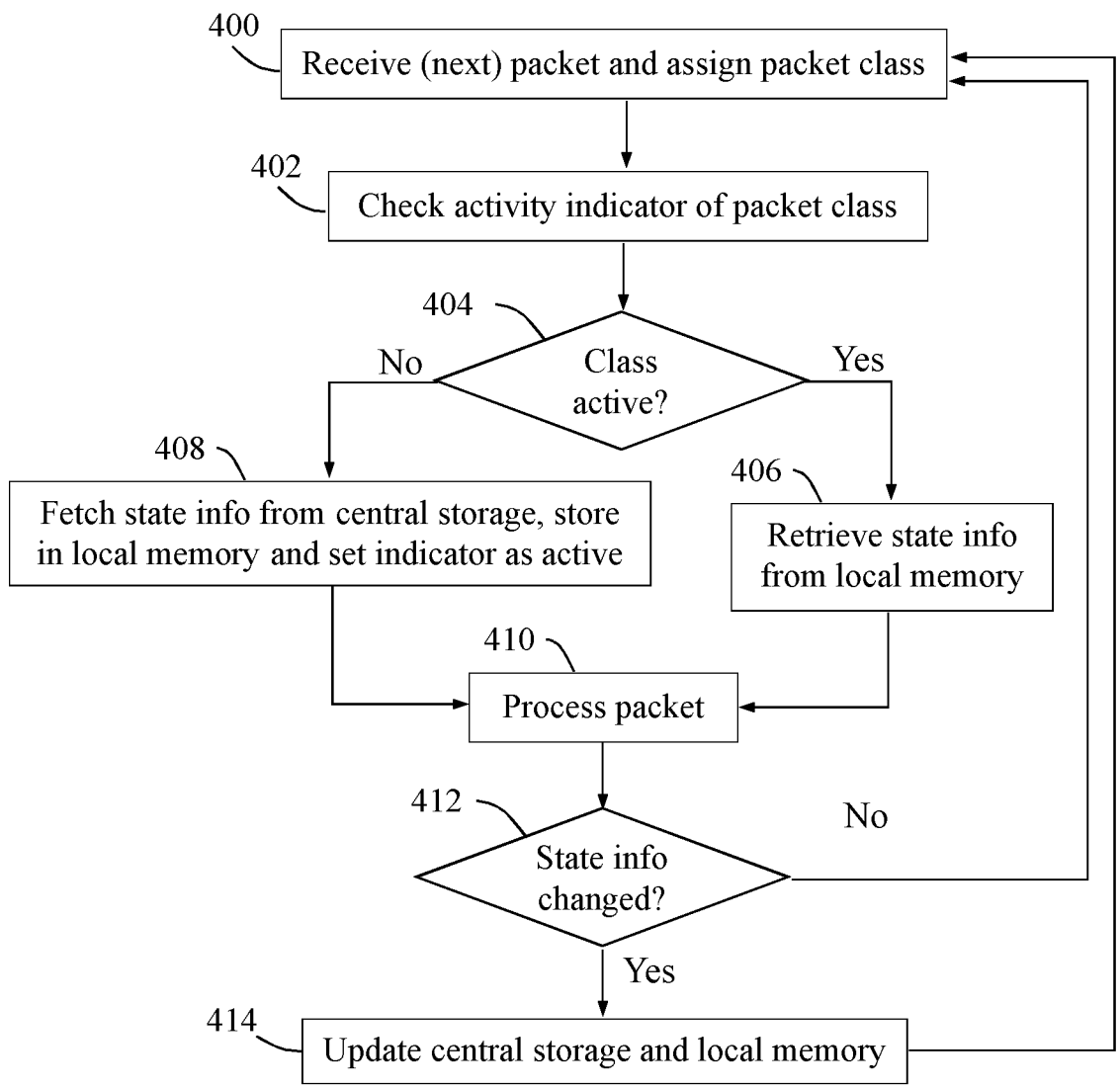
FIG. 4 is a flow chart illustrating an example of how a traffic processing unit may operate in more detail, according to further example embodiments.

In the procedure of FIG. 4, the traffic processing unit 200 further checks in an action 412 whether the state information has changed or not, e.g. modified depending on the processing made in action 410. If there is no reason to change the state information, the traffic processing unit 200 can basically move back to action 400 and repeat the procedure for a next received packet. Otherwise, the traffic processing unit 200 will update the state information in both the central storage and the local storage in an action 414, and then move back to action 400 for handling the next received packet. The procedure of FIG. 4 can thus be performed for any received packet in one or more traffic flows.

Figure 5:
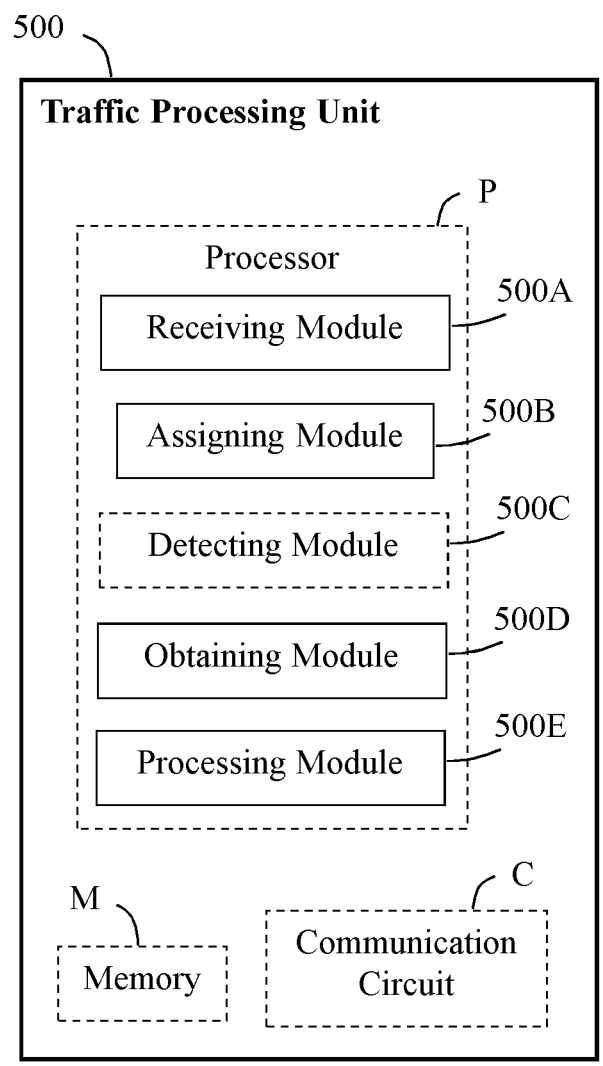
FIG. 5 is a block diagram illustrating how a traffic processing unit may be structured, according to further example embodiments.

The block diagram in FIG. 5 illustrates a detailed but non-limiting example of how a traffic processing unit 500 may be structured to bring about the above-described solution and embodiments thereof. The traffic processing unit 500 may be configured to operate according to any of the examples and embodiments for employing the solution as described herein, where appropriate and as follows. The traffic processing unit 500 is shown to comprise a processor P and a memory M, said memory comprising instructions executable by said processor whereby the traffic processing unit 500 is operable as described herein. The traffic processing unit 500 also comprises a communication circuit C with suitable equipment for sending and receiving packets in the manner described herein.

The communication circuit C may be configured for communication with a distribution device, such as the distribution device 102 shown in FIG. 1, including receiving packets of a traffic flow as in action 300, and for communication with a collection device, such as the collection device 104 shown in FIG. 1, using suitable protocols and interfaces. Such communication may be performed over any suitable interfaces and nodes depending on the implementation, although this is not necessary to describe here as such in any detail. The solution and embodiments herein are thus not limited to using any specific types of networks, technology or protocols for communication.

The traffic processing unit 500 comprises means configured or arranged to basically perform the actions in FIG. 3 and at least some of the actions in FIG. 4, and more or less as described above for the traffic processing unit 200 in various examples. In FIG. 5, the traffic processing unit 500 is arranged or configured to handle traffic in a communication network when the traffic is distributed across a set of traffic processing units including the traffic processing unit 500.

The traffic processing unit 500 is configured to receive a packet of a traffic flow distributed to said traffic processing unit. This receiving operation may be performed by a receiving module 500A in the traffic processing unit 500, e.g. in the manner described above for action 300.

The traffic processing unit 500 is further configured to assign a packet class to the received packet, out of a set of predefined classes, based on information derivable from the received packet, wherein the packet class is detected or noted as being active or inactive in the traffic processing unit based on an activity indicator of the packet class maintained in the traffic processing unit. The above assigning operation may be performed by an assigning module 500B in the traffic processing unit 500, e.g. as described above for action 302. The assigning module 500B could alternatively be named a logic module or analyzing module. Further, a detecting module 500C may be employed in the traffic processing unit 500 to perform the above active or inactive detection of the assigned packet class. In case no such detecting module 500C is employed, the detecting or noting the packet class as being active or inactive may basically be performed by the assigning module 500B.

The traffic processing unit 500 is also configured to obtain state information pertaining to said assigned packet class. If the packet class is detected as active, the traffic processing unit 500 is configured to retrieve the state information from a local storage in the traffic processing unit, e.g. from the memory M, e.g. as described above for action 406. If the packet class is detected as inactive, the traffic processing unit 500 is configured to fetch the state information from a central storage where state information of different packet classes is maintained, e.g. as described above for action 408. This obtaining operation may be performed by an obtaining module 500D in the traffic processing unit 500, basically as described above for action 306. The obtaining module 500D could alternatively be named a state information module or acquiring module.

The traffic processing unit 500 is further configured to perform stateful packet processing of the received packet based on the obtained state information. This operation may be performed by a processing module 500E in the traffic processing unit 500, e.g. as described above for action 308. The processing module 500E could alternatively be named to indicate what type of processing it performs, such as a firewall module in case the traffic processing unit 500 is operable as a firewall.

It should be noted that FIG. 5 illustrates various functional units or modules in the traffic processing unit 500, and the skilled person is able to implement these functional modules or in practice using suitable software and hardware. Thus, the solution is generally not limited to the shown structures of the traffic processing unit 500, and the functional units or modules 500A-E therein may be configured to operate according to any of the features and embodiments described in this disclosure, where appropriate.

The functional modules or units 500A-E described above can be implemented in the traffic processing unit 500 by means of suitable hardware and program modules of a computer program comprising code means which, when run by the processor P causes the traffic processing unit 500 to perform at least some of the above-described actions and procedures.

In FIG. 5, the processor P may comprise a single Central Processing Unit (CPU), or could comprise two or more processing units such as CPUs. For example, the processor P may include a general purpose microprocessor, an instruction set processor and/or related chip sets and/or a special purpose microprocessor such as an Application Specific Integrated Circuit (ASIC). The processor P may also comprise a storage for caching purposes.

Each computer program may be carried by a computer program product in the traffic processing unit 500 in the form of a memory having a computer readable medium and being connected to the processor P. The computer program product or memory in the traffic processing unit 500 may thus comprise a computer readable medium on which the computer program is stored e.g. in the form of computer program modules or the like. For example, the memory may be a flash memory, a Random-Access Memory (RAM), a Read-Only Memory (ROM), an Electrically Erasable Programmable ROM (EEPROM) or Hard Drive storage (HDD), and the program modules could in alternative embodiments be distributed on different computer program products in the form of memories within the traffic processing unit 500.

The solution described herein may thus be implemented in the traffic processing unit 500 by a computer program comprising instructions which, when executed on at least one processor, cause the at least one processor to carry out the actions according to any of the above embodiments and examples, where appropriate. The solution may also be implemented in a carrier containing the above computer program, wherein the carrier is one of an electronic signal, an optical signal, a radio signal, or a computer readable storage product or computer program product.

Some further examples of how the above-described embodiments and features could be employed in practice will now be outlined. The actual processing functionality described herein will be generally referred to as a Central Processing Unit, CPU, which is a common term in the field of computers and data processing.

In the example of a multi-CPU scalable stateful firewall used for high capacity (line-rate) traffic interception, which firewall could be deployed in a so-called "bump-in-the-wire" configuration, the embodiments herein enable scaling-in and scaling-out of stateful firewall processing capacity. This can be done by spreading the traffic to be intercepted over a set of available CPUs by using a simple stateless flow-based packet distribution device which could be achieved by an ordinary layer-3 Ethernet switch or similar, which is based on a low cost component, e.g. an application-specific standard product, ASSP.

The embodiments herein can advantageously be realized in a range of products where there is a need for high throughput and dynamical scalability of processing capacity in conjunction with complex processing of state information acquired on-the-fly through deep packet inspection of the traffic. This is often the case for products used in network boundary gateway points, such as, firewalls (FW), security gateways (SEG) and session border gateways (SBG), and in arrangements where scalability is required the embodiments herein enable the use of simple and cost effective stateless distribution devices.

Multiple CPU hardware instances and corresponding parallel firewall processing units can be used to achieve firewall processing capacity at high speed. The CPU processing capacity could be increased by distributing the firewall arriving traffic flow to a set of in-parallel processing firewall units allocated to a corresponding number of CPU hardware instances, using a distribution method called flow based Equal Cost Multi Paths (ECMP). In this distribution method, the arriving packet traffic flow is divided into subsets of traffic flow based on a classification of IP datagram packets according to information in the IP packet header, and then packet transport is conducted in such a way that the subsets of traffic flow are spread out over the set of available "next-hop devices", that is, firewall processing units.

After packets arrive on an individual firewall processing unit which is allocated to a CPU in the described multiprocessor configuration, by the embodiments herein, the datagram packets of each subset of ECMP distributed traffic flow are classified anew into a set of enumerated packet classes, wherein packets of each enumerated packet class are subjected to firewall processing software instructions with a dedicated memory volume at disposal for storage of traffic state information pertaining to packets of the enumerated packet class. This state information may be related to a collection of individual firewall sessions. However, if the enumerated packet class is detected inactive, the memory volume dedicated for the enumerated packet class will be updated with state information for the enumerated packet class fetched from a consolidation repository, or from a location indicated by the consolidation repository. Then the traffic packets can be subjected to firewall processing software instructions using the fetched state information.

One purpose of the embodiments herein may be to use a simple stateless flow based ECMP distribution device as ingress traffic distributor, and yet facilitate a reconfiguration event of a CPU with an allocated stateful firewall processing unit, being added or removed while the system is in service while still handling ongoing traffic.

For arriving packet traffic, it is common in a stateful firewall to observe protocol state transitions with respect to acquired state information and protocol specific governing rules, and thereafter separate the processing of illicit traffic packets from the processing of legitimate traffic packets. Further, the traffic state information is often dynamic and may be acquired through traffic interception and packet inspection. The traffic state information may also be of semi-static nature, for example, data indicating that a certain traffic-flow is to be rate limited or copied. It should be noted that when packets arrive to firewall processing units the simple stateless ingress ECMP distribution device is completely unaware of any firewall inspected traffic state information data on the firewall processing units, and hence the traffic distribution to firewall processing units is decoupled from the dependencies of data location, that is, where specific firewall session data is located.

The classification of packets into enumerated packet classes on the firewall processing units as described herein can be done in a more fine-granular way than the division into subsets of traffic flow done by the bump-in-the-wire ingress ECMP distributor, that is, a subset of flows distributed to an instance of a firewall processing unit, can be classified into one or more enumerated packet classes.

One potential area to which the embodiments herein apply is the function of in-service re-configuration of the firewall in response to adding or removing CPUs. In this case, consistency with respect to the sets of in parallel distributed traffic flows and the sets of in-firewall memorized state information needs to be preserved, e.g. in the event of a re-configuration taking place as a planned operation and maintenance activity adding an extra CPU unit, or when a re-configuration occurs spontaneously, triggered by a detected processor failure.

The embodiments herein may achieve an advantage in that the ingress ECMP device is decoupled from the tasks of relocating firewall state information across CPUs in a reconfiguration scenario such that the traffic distribution device, which maintains no knowledge of how firewall state information is organized or stored on firewall processing units, may on its own accord, for instance in response to detecting the loss of CPU or firewall processing unit (or discovery thereof), change the ECMP distribution pattern of traffic flow. In case one or more subsets of traffic flow spontaneously arrives at another available firewall processing unit than before the change of distribution pattern, the firewall processing units will automatically be adjusted to the new distribution pattern with the rearranged set of available firewall processing units. With the decoupling of the above described tasks, which can be achieved by the embodiments herein, a simple traffic splitting device without any built-in advanced state information aware logic and purpose-specific coordination protocol can be used for the ingress stage of traffic distribution.

In the case of a bump-in-the-wire scalable firewall, the embodiments herein enable an effective bulk relocation of memorized state information, handled per enumerated packet class, done by using a simple stateless ECMP distribution device. It is also possible to perform the task of splitting the traffic at line rate by a distributor-device realized by a merchant silicon ASSP, whereas complex stateful firewall processing is done by general purpose processors.

While the solution has been described with reference to specific exemplifying embodiments, the description is generally only intended to illustrate the inventive concept and should not be taken as limiting the scope of the solution. For example, the terms "traffic processing unit", "traffic distribution device", "state information", "packet class", "local storage", "memory volume", "central storage" and "activity indicator" have been used throughout this disclosure, although any other corresponding entities, functions, and/or parameters could also be used having the features and characteristics described here. The solution is defined by the appended claims.

The invention claimed is:

1. A method performed by a traffic processing unit (TPU) for handling traffic in a communication network, the method comprising:
for each packet class identifier included in a set of packet class identifiers, the TPU storing an associated storage indicator that indicates whether or not state information for the packet class identified by the packet class identifier is stored in a local storage;
the TPU receiving a packet of a traffic flow;
based on information derived from the received packet, the TPU assigning one of said packet class identifiers to the received packet;
the TPU using the assigned packet class identifier to retrieve the storage indicator associated with the assigned packet class identifier;
the TPU retrieving the state information for the packet class identified by the assigned packet class identifier based on the retrieved storage indicator; and
performing stateful packet processing of the received packet based on the obtained state information, wherein retrieving the state information for the packet class identified by the assigned packet class identifier based on the retrieved storage indicator comprises:
determining whether or not the retrieved storage indicator indicates that the state information is stored in the local storage; and either
i) retrieving the state information from the local storage after and as a result of determining that the retrieved storage indicator indicates that the state information is stored in the local storage, or
ii) retrieving the state information from a non-local storage after and as a result of determining that the retrieved storage indicator indicates that the state information is not stored in the local storage.

2. The method of claim 1, wherein retrieving the state information for the packet class identified by the assigned packet class identifier based on the retrieved storage indicator comprises retrieving the state information from the non-local storage after and as a result of determining that the retrieved storage indicator indicates that the state information is not stored in the local storage.

3. The method of claim 2, further comprising, after retrieving the state information from the non-local storage, storing the retrieved state information in the local storage and changing the storage indicator associated with the assigned packet class identifier to indicate that the state information is stored in the local storage.

4. The method of claim 1, wherein the storage indicator associated with the assigned packet class identifier is maintained in a packet class record with storage indicators of different packet classes for traffic flows that have been handled by the traffic processing unit.

5. The method of claim 1, wherein said local storage comprises multiple local memory volumes containing state information of different packet classes.

6. The method of claim 5, wherein each local memory volume contains state information of one or more packet classes.

7. The method of claim 1, wherein said information derived from the received packet comprises at least one of a source address or a destination address.

8. The method of claim 1, further comprising:
after retrieving the state information, determining that the state information has not been used by the traffic processing unit for at least a certain time-out period; and
deleting the state information from the local storage as a result of determining that the state information has not been used by the TPU for at least the certain time-out period.

9. The method of claim 1, wherein the traffic is received when distributed by a stateless distribution device such as a layer-3 Ethernet switch.

10. The method of claim 1, wherein the traffic processing unit is implemented as a Virtual Machine.

11. A traffic processing unit (TPU) arranged to handle traffic in a communication network, wherein the TPU comprises:
a receiver for receiving a packet of a traffic flow; and
a processing circuitry configured to:
for each packet class identifier included in a set of packet class identifiers, store an associated storage indicator that indicates whether or not state information for the packet class identified by the packet class identifier is stored in a local storage;
based on information derived from the received packet, assign one of said packet class identifiers to the received packet;
use the assigned packet class identifier to retrieve the storage indicator associated with the assigned packet class identifier;
retrieve the state information for the packet class identified by the assigned packet class identifier based on the retrieved storage indicator; and
perform stateful packet processing of the received packet based on the obtained state information, wherein
the TPU is configured to retrieve the state information for the packet class identified by the assigned packet class identifier based on the retrieved storage indicator by:
determining whether or not the retrieved storage indicator indicates that the state information is stored in the local storage; and either
i) retrieving the state information from the local storage after and as a result of determining that the retrieved storage indicator indicates that the state information is stored in the local storage, or
ii) retrieving the state information from a non-local storage after and as a result of determining that the retrieved storage indicator indicates that the state information is not stored in the local storage.

12. The traffic processing unit of claim 11, wherein the TPU is configured such that, after retrieving the state information from the non-local storage, the TPU stores the state information in the local storage.

13. The traffic processing unit of claim 12, wherein the TPU is configured such that, upon storing the state information in the local storage, the TPU changes the storage indicator associated with the assigned packet class identifier to indicate that the state information is stored in the local storage.

14. The traffic processing unit of claim 11, wherein the traffic processing unit is configured to maintain the storage indicator associated with the assigned packet class identifier in a packet class record with storage indicators of different packet classes for traffic flows that have been handled by the traffic processing unit.

15. The traffic processing unit of claim 11, wherein said local storage comprises multiple local memory volumes adapted to contain state information of different packet classes.

16. The traffic processing unit of claim 15, wherein each local memory volume is adapted to contain state information of one or more packet classes.

17. The traffic processing unit of claim 11, wherein the traffic processing unit is configured to derive from the received packet said information comprising at least one of a source address or a destination address.

18. The traffic processing unit of claim 11, wherein if the state information for said traffic flow is changed, the local memory volume and the central storage are updated accordingly.

19. The traffic processing unit of claim 11, wherein the traffic is received when distributed by a stateless distribution device such as a layer-3 Ethernet switch.

20. A computer program product comprising a non-transitory computer readable medium storing a computer program comprising instructions which, when executed on at least one processor, cause the at least one processor to carry out the method of claim 1.

* * * * *